Feb. 22, 1966  STIG CARL-OSKAR ERNOLF  3,236,985
ELECTRICAL APPLIANCE HAVING SWITCH CONTROLLED
BY ITS MANIPULATING HANDLE
Filed July 11, 1963  2 Sheets-Sheet 1

INVENTOR.
Stig Carl-Oskar Ernolf
BY
Edmund G. Vermander
his ATTORNEY

Feb. 22, 1966  STIG CARL-OSKAR ERNOLF  3,236,985
ELECTRICAL APPLIANCE HAVING SWITCH CONTROLLED
BY ITS MANIPULATING HANDLE
Filed July 11, 1963  2 Sheets-Sheet 2

INVENTOR.
Stig Carl-Oskar Ernolf
BY
Edmund A. Venanda
his ATTORNEY

United States Patent Office 3,236,985
Patented Feb. 22, 1966

1

3,236,985
ELECTRICAL APPLIANCE HAVING SWITCH CONTROLLED BY ITS MANIPULATING HANDLE
Stig Carl-Oskar Ernolf, Stockholm, Sweden, assignor to Aktiebolaget Electrolux, Stockholm, Sweden, a corporation of Sweden
Filed July 11, 1963, Ser. No. 294,391
11 Claims. (Cl. 200—153)

My invention relates to electrical appliances of the kind that are movable over a surface and manipulated by an elongated handle which in use normally is inclined to the vertical and is movable between upright and substantially horizontal positions.

It has been the practice heretofore to provide mechanism for controlling the switch of an electrical appliance of this kind responsive to angular movement of the handle.

An object of my invention is to provide an improved control of this type which is of simplified construction and can be readily assembled.

Another object of my invention is to provide an improved control having a cam which actuates a switch responsive to angular movement of the handle and also forms a component part of mechanism to hold the handle in an upright position when it is moved thereto.

A further object is to provide a lug on the cam which functions as a stop and prevents movement of the handle past its upright position when it is moved thereto from an inclined position.

Further objects and advantages of my invention will become apparent as the following description proceeds, and the features of novelty which characterize the invention will be pointed out with particularity in the claims annexed to and forming a part of this specification.

For a better understanding of my invention, reference may be had to the following description taken in connection with the accompanying drawing, in which.

Figure 1:
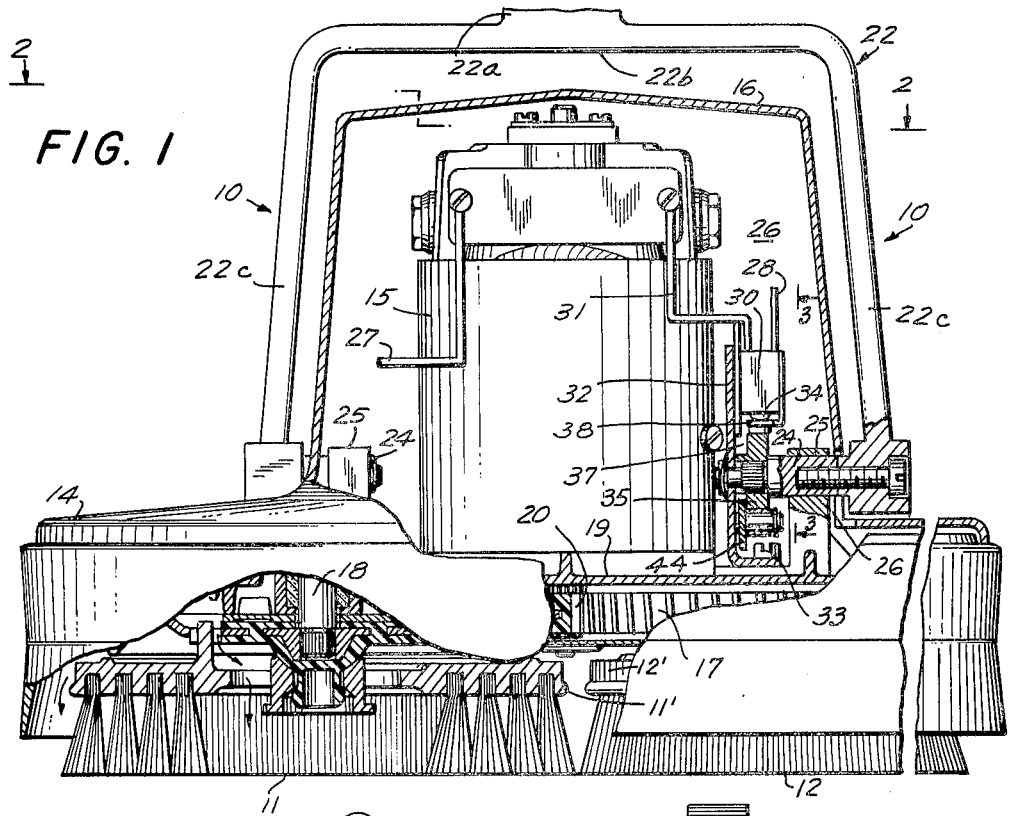
FIG. 1 is a front view, partly broken away and in section, of surface treating apparatus embodying my invention.

Referring to the drawing, the invention is shown in connection with surface treating apparatus 10 having a pair of rotatable brushes 11 and 12 which project downward beneath a base or hood 14 and are arranged to be driven by an electric motor 15 housed in an upright casing 16 positioned over an opening in the hood. The brushes 11 and 12, having brush backs 11' and 12', respectively, may be detachably secured in any suitable manner to the hubs of gears 17 which mesh with one another and are rotatable on shafts 18 provided on a frame 19 at the underside of the base 14. The gears 17 are driven by a pinion 20 which is fixed to the lower end of motor shaft 21 and meshes with one of the gears 17.

The surface treating apparatus is adapted to be manipulated by a handle 22 which includes an elongated rod 22a whose lower end is connected to the closed end of an inverted U-shaped yoke or fork 22b having spaced apart arms 22c. The lower ends of the arms 22c are connected to shafts 24 pivotally mounted in brackets 25 which are secured to the frame 19 and disposed in the space 26 between the electric motor 15 and casing 16.

2

The electrical circuit for the motor 15 includes conductors 27 and 28 forming part of a cord 29 extending exteriorly of the apparatus and adapted to be connected to a source of electrical supply. The conductors 27 and 28 are connected to the motor 15 and to an electric switch 30, respectively, which in turn are connected to one another by the conductor 31 to complete the motor circuit. The electric switch 30 is fixed to an upwardly extending plate 32 of an angle member fixed at 33 to the frame 19. The electric switch 30 includes an operating member 34 which is movable between inner and outer positions and is biased to its outer position, the switch being closed and open in the inner and outer positions, respectively, of the member 34.

In accordance with my invention, I provide a cam 35 which is employed to control the switch 30 responsive to angular movement of the handle 22 and which also forms a component part of mechanism to hold the handle 22 in an upright position when it is moved thereto. The cam 35 is fixed to the shaft 24 at 36 and is angularly movable therewith. As shown in FIG. 1, the inner end of the shaft 24 extends through an opening in the plate 32 and the cam 35 is fixed to the shaft so that it is axially spaced from the plate 32 and a gap 37 is formed therebetween. The cam 35 is arranged to flex and impart movement to a leaf spring 38, the outer bent end of which is arranged to bear against the periphery of the cam and the opposite end of which is fixed at 39 to the plate 32. When the leaf spring 38 is flexed upward by the cam 35 from the position shown in FIG. 3 to the position shown in FIG. 4, the spring 38 moves the switch operating member 34 from its outer position to its inner position. When this occurs the electric switch 30 is closed to complete the circuit for the electric motor 15 to render the latter operable to drive the brushes 11 and 12.

Figure 3:
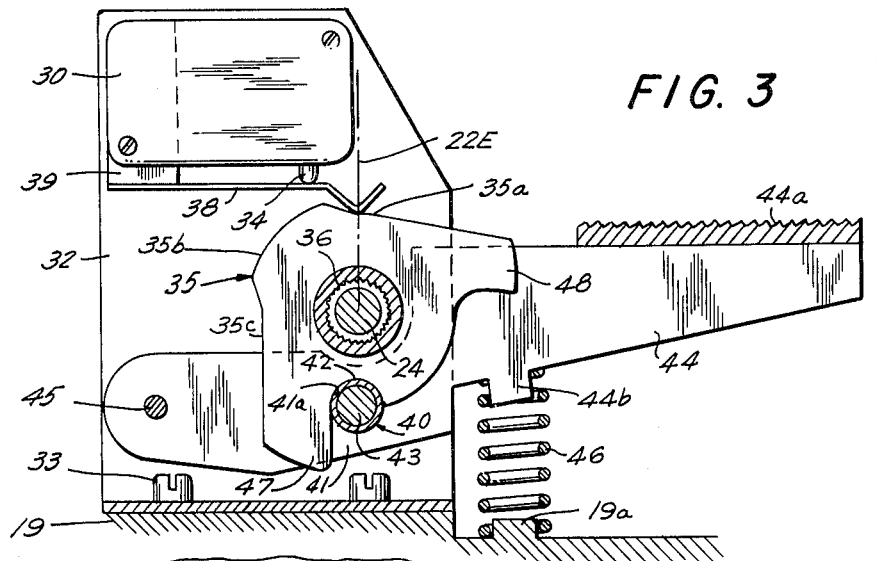
FIG. 3 is a fragmentary sectional view taken at line 3—3 of FIG. 1.

When the handle 22 is upright and vertical, as indicated by the dot and dash line 22E in FIG. 3, the cam 35 is in the position shown in this figure and the outer bent end of the leaf spring 38 bears against the periphery of the cam at a curved zone 35a. When the leaf spring 38 bears against zone 35a of cam 35, the switch operating member 34 is biased to its outer position and the electric switch 30 is open. Under these conditions, the electric motor 15 is disconnected from the source of electrical supply and the brushes 11 and 12 are not being driven.

Figure 4:
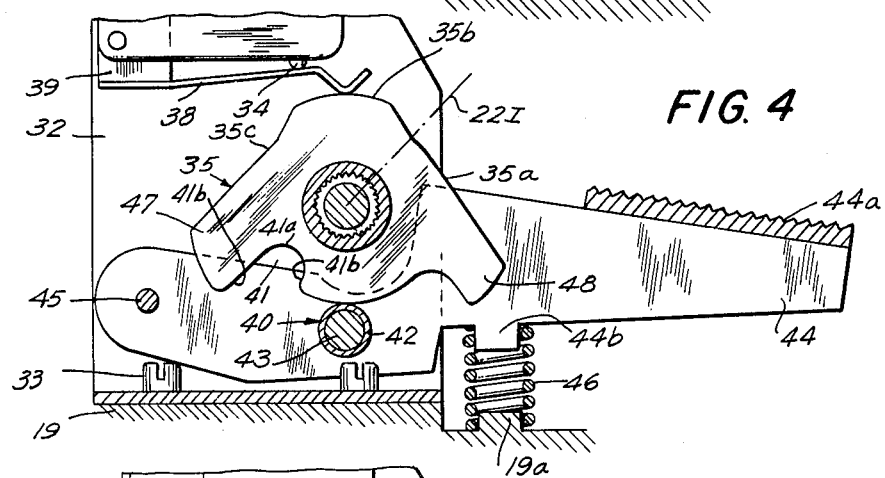
FIGS. 4 and 5 are sectional views similar to FIG. 3 to illustrate the construction more clearly.

When the handle 22 is now moved to a position inclined to the vertical, as indicated by the dot and dash line 22I in FIG. 4, the cam 35 is in the position shown in this figure and the outer bent end of the leaf spring 38 bears against the periphery of the cam at raised curved zone 35b. When the leaf spring 38 bears against the zone 35b of cam 35, the leaf spring 38 is flexed upward and moves the switch operating member 34 to close the switch 30 and complete the circuit for motor 15, as explained above.

Figure 5:
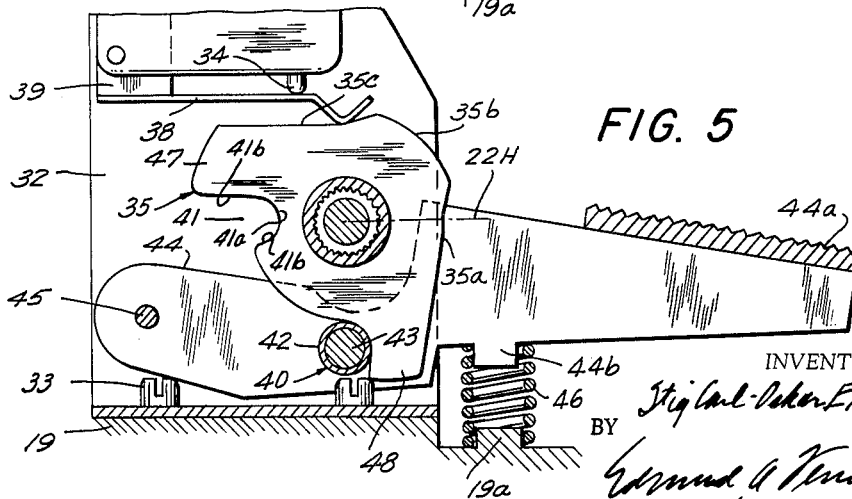

When the handle 22 is moved to a substantially horizontal position, as indicated by the dot and dash line 22H in FIG. 5, the cam 35 is in the position shown in this figure and the outer bent end of the leaf spring 38 bears against the periphery of the cam at a zone 35c. When the leaf spring 38 bears against zone 35c of cam 35, the switch operating member 34 is biased to its outer position and the electric switch 30 is open and the motor 15 is disconnected from the source of electrical supply.

It will now be understood that when the handle 22 is in its upright and substantially horizontal positions, the cam 35 will be angularly moved to such positions that it will be ineffective to impart sufficient movement to leaf spring 38 to effect movement of the switch operating member 34 to its closed position. However, when the handle 22 is inclined to the vertical and in a position it normally assumes when the surface treating apparatus is being manipulated over a surface, the cam 35 will be angularly moved to such a position that it will be effective to impart sufficient movement to leaf spring 38 to effect movement of the switch operating member 34 to its closed position to complete the circuit for the electric motor 15. It will now be understood that the cam 35 and leaf spring 38 together form structure which is operable to impart movement to the operating member 34 of the switch 30.

Figure 2:
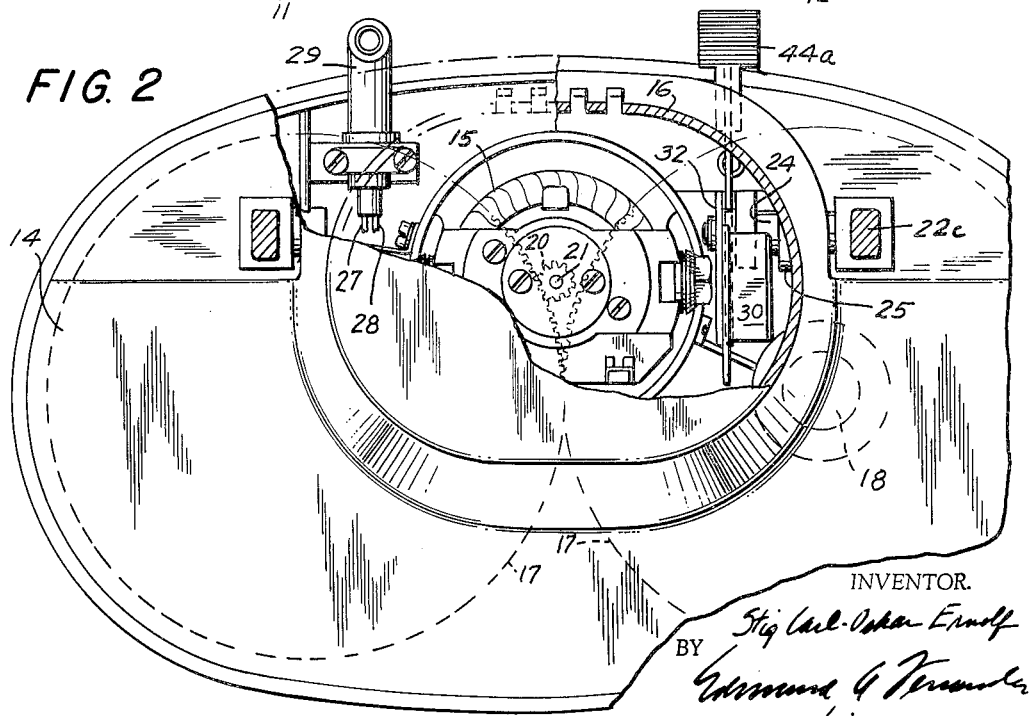
FIG. 2 is a fragmentary horizontal sectional view taken at line 2—2 of FIG. 1.

In accord with my invention, the cam 35 also forms a component part of mechanism to hold the handle 22 in its upright position when it is moved thereto. The holding mechanism comprises a lock or hold member 40 which is movable into and from a notch or recess 41 formed by a groove 41a at the periphery of the cam 35. The hold member 40 comprises a hollow sleeve 42 which is rotatably mounted on a pin 43 which is parallel to the shaft 24 and fixed at one end to a lever or part 44 pivotally mounted on the plate or support 32 at 45. As shown in FIGS. 1 and 2, the lever 44 is vertically movable in the gap 37 and extends rearwardly through an opening in the casing 16. The part of the lever 44 projecting exteriorly of the casing 16 serves as a foot-operated member 44a. The bottom of the lever 44 is formed with a boss 44b which receives one end of a coil spring 46, the opposite end of which is seated over a raised boss 19a formed in the frame 19. When the handle 22 is moved to its upright position, as indicated by the dot and dash line 22E in FIG. 3, the coil spring 46 becomes effective to move the lever 44 upward about its pivot 45 in a path of movement transverse to the axis of the shaft 24 and move the hold member 40 into the recess 41 of the cam 35 between the spaced walls 41b thereof.

To release the hold member 40 the foot-operated member 44a is depressed against the action of the spring 46 and the handle 22 is moved toward the inclined position indicated by the dot and dash line 22I in FIG. 4. After the cam 35 has been angularly moved sufficiently with the recess 41 to move out of vertical alignment with the hold member 40, the foot-operated member 44a can be released and the roller 42 of the hold member 40 will rotate on the periphery of the cam 35 as it is being angularly moved with respect to the hold member 40.

When the handle 22 is moved from its inclined position indicated by the dot and dash line 22I in FIG. 4 to its upright position indicated by the dot and dash line 22E in FIG. 3, the roller 42 of the hold member 41 rotates on the pin 43 as it rides on the periphery of the cam 35. When the notch 41 on the cam 35 moves into vertical alignment with the hold member 40, the coil spring 46 becomes effective to move the lever 44 upward about its pivot 45, whereby the hold and lock member 40 will automatically move into the notch 41 on the cam 35 and hold the handle 22 in the upright position to which it has been moved.

The cam 35 is formed with a lug or part 47 adjacent to the notch 31 which functions as a stop and prevents movement of the handle 22 in a counterclockwise direction from the vertical position indicated by the dot and dash line 22E in FIG. 3. The cam 35 may also be formed with a second lug or part 48 adjacent to the peripheral zone 35a which also functions as a stop and prevents movement of the handle 22 in a clockwise direction from the horizontal position indicated by the dot and dash line 22H in FIG. 5. In view of the foregoing, it will now be understood that the operating member 34 of the electric switch 30 is movable in opposing directions between a first position seen in FIGS. 3 and 5 and a second position seen in FIG. 4 and biased to the first position in FIGS. 3 and 5. As explained above, the cam 35 coacts with the switch operating member 34 to move the latter in one direction of movement from its first biased position to the second position.

The electric switch 30 is closed in one position of the operating member 34 and open in the other position of the operating member 34. Structure comprising the cam 35 functions to maintain the switch operating member 34 in its one switch-open position when the handle 22 is moved to its upright and substantially horizontal positions 22E and 22H, respectively, and functions to maintain the switch operating member 34 in its other switch-closed position when the handle 22 is moved to its inclined position 22I.

The hold member 40 is mounted on the lever or part 44 for movement between first and second positions at the periphery of the cam 35 in a path of movement transverse to the shaft 24, the first position being shown in FIGS. 4 and 5 and the second position being shown in FIG. 3. The hold member 40 remains parallel to the axis of the shaft 24 while being moved between its first and second positions. The coil spring 46 only functions to move the hold member 40 into the convex-shaped recess 41 of the cam 35 when the handle 22 is moved to its upright position 22E to locate the recess 41 in the path of movement of the hold member 40.

Although I have shown and described a single embodiment of my invention, I do not wish to be limited to the particular arrangement set forth, and I intend in the following claims to cover all modifications which do not depart from the spirit and scope of the invention.

I claim:

1. The combination with an electrical appliance movable over a surface, of
   a frame,
   an elongated handle having a horizontal shaft at its lower end,
   means for rotatably mounting said shaft on said frame to enable said handle to be moved to upright and substantially horizontal positions and an inclined position therebetween,
   a motor mounted on said frame,
   means including an electric switch for controlling said motor, said electric switch having an operating member movable in opposing directions between first and second positions and biased to said first position, said electric switch being closed in one position of said operating member and open in the other position of said operating member,
   a cam fixed to said shaft and rotatable therewith, said cam having first, second and third zones at its periphery, moving structure including said cam to impart movement to said switch operating member in one of said directions of movement from its first biased position to its second position,
   said first and second and third zones at the periphery of said cam being in functioning relation with said switch operating member when said handle is respectively in its upright and inclined and substantially horizontal positions,
   means comprising said moving structure including said cam to maintain said switch operating member in said one switch-open position when said moving structure is in functioning relation with the first and third zones of the periphery of said cam and to maintain said switch operating member in said other switch-closed position when said moving structure is in functioning relation with the second zone of the periphery of said cam,
   said cam having a groove at its periphery defining a convex-shaped recess opening outward at the periphery of said cam and having spaced walls,
   a hold member,
   means for mounting said hold member for movement between first and second positions at the periphery of said cam in a path of movement transverse to said shaft and for maintaining said hold member substantially parallel to the axis of said shaft in said path of movement between said first and second positions, resilient means for biasing said hold member at the periphery of said cam from its first position toward its second position, said resilient means only functioning to move said hold member into said convex-shaped recess which defines said second position at the periphery of said cam when said shaft and said cam fixed thereto are rotated by movement of said handle to its upright position to locate said recess in the path of movement of said hold member, and the spaced walls of said recess coacting with said hold member and functioning to hold said handle in its upright position and prevent angular movement of said handle about said shaft at its lower end when said hold member moves into said recess.

2. An electrical appliance as set forth in claim 1 in which said means for mounting said hold member for movement between said first and second positions at the periphery of said cam comprises a part, a support, means for mounting said part for pivotal movement on said support, said hold member being fixed to said part and movable therewith, and said resilient means for biasing said hold member from its first position toward its second position at the periphery of said cam coacting with said part.

3. An electrical appliance as set forth in claim 2 in which said part is movable against the bias of said resilient means by force applied thereto to move said hold member from the recess of said cam and enable said handle to be moved from its upright position.

4. An electrical appliance as set forth in claim 2 which includes a housing in which said switch and said cam and said part are disposed, said housing having an opening through which a portion of said part extends exteriorly of said housing, said portion of said part serving as a pedal, and said part being movable against the bias of said resilient means by operation of the pedal to move said hold member from the recess of said cam and enable said handle to be moved from its upright position.

5. An electrical appliance as set forth in claim 2 in which said hold member comprises a pin which is fixed to said part and is substantially parallel to said shaft and a hollow sleeve rotatably mounted on said pin.

6. An electrical appliance as set forth in claim 1 in which said hold member is movable from its second position in the recess of said cam by force applied thereto to enable said handle to be moved from its upright position toward its inclined position, and said cam having a part projecting radially outward from the axis of said shaft at the vicinity of the recess and serving as a stop, said hold member being in the path of movement of said stop when said handle is being moved from its inclined position toward its upright position and being physically contacted by said stop when said handle reaches its upright position.

7. An electrical appliance as set forth in claim 6 in which said projecting part of said cam is at the immediate vicinity of said recess and serves as a stop when said recess is positioned in line with said path of movement of said hold member.

8. An electrical appliance as set forth in claim 1 in which said cam includes a part projecting radially outward from the axis of said shaft and functions as a stop, said hold member being in the path of movement of said stop when said handle is being moved from its inclined position toward its substantially horizontal position and being physically contacted by said stop when said handle reaches its substantially horizontal position.

9. The combination with an electrical appliance movable over a surface, of a frame, an elongated handle having a horizontal shaft at its lower end, means for rotatably mounting said shaft on said frame to enable said handle to be moved to upright and substantially horizontal positions and an inclined position therebetween, a motor mounted on said frame, means including an electric switch for controlling said motor, said electric switch having an operating member movable between switch-open and switch-closed positions and biased to said switch-open position, a cam fixed to said shaft and rotatable therewith, said cam having first, second and third zones at its periphery, a flexible leaf spring interposed between the periphery of said cam and said operating member and coacting therewith, said first and second and third zones at the periphery of said cam coacting with said spring when said handle is respectively in its upright and inclined and substantially horizontal positions, means comprising said cam and said spring functioning to maintain said switch operating member in its switch-open position when said spring coacts with the first and third zones of the periphery of said cam and functioning to maintain said switch operating member in its switch-closed position when said spring coacts with the second zone of the periphery of said cam, said cam having a groove at its periphery defining a convex-shaped recess opening outward at the periphery of said cam and having spaced walls, a hold member, means for mounting said hold member for movement between first and second positions at the periphery of said cam in a path of movement transverse to said shaft and for maintaining said hold member substantially parallel to the axis of said shaft in said path of movement between said first and second positions, resilient means for biasing said hold member at the periphery of said cam from its first position toward its second position, said resilient means only functioning to move said hold member into said convex-shaped recess which defines said second position at the periphery of said cam when said shaft and said cam fixed thereto are rotated by movement of said handle to its upright position to locate said recess in the path of movement of said hold member, and the spaced walls of said recess coacting with said hold member and functioning to hold said handle in its upright position and prevent angular movement of said handle about said shaft at its lower end when said hold member moves into said recess.

10. An electrical appliance as set forth in claim 9 in which said cam includes a part projecting radially outward from the axis of said shaft at the recess, said part functioning as a stop, and said hold member being in the path of movement of said stop when said handle is being moved from its inclined position toward its upright position and being physically contacted by said stop when said handle reaches its upright position.

11. An electrical appliance as set forth in claim 9 which includes a housing in which said switch and cam are disposed, said means for mounting said hold member for movement between first and second positions at the periphery of said cam comprising a pivotally mounted lever upon which said hold member is fixed, said resilient means comprising a coil spring coacting with said lever to bias said hold member toward the periphery of said cam, said housing having an opening through which a portion of said lever extends outwardly therethrough, said lever portion serving as a pedal, and said lever being movable against the bias of said coil spring by force applied to said pedal to move said hold member from the recess of said cam and enable said handle to be moved from its upright position.

References Cited by the Examiner

UNITED STATES PATENTS

| | | | |
|---|---|---|---|
| 2,215,414 | 9/1940 | Wilcox | 200—153 |
| 3,094,592 | 6/1963 | Fisher | 200—153 |

FOREIGN PATENTS 910,813  11/1962  Great Britain.

KATHLEEN H. CLAFFY, *Primary Examiner.*

ROBERT K. SCHAEFER, BERNARD A. GILHEANY,
*Examiners.*